Patented Mar. 31, 1942

2,278,373

UNITED STATES PATENT OFFICE 2,278,373

MANUFACTURE OF AMINES

John F. Olin, Grosse Ile, Mich., assignor to Sharples Chemicals Inc., a corporation of Delaware No Drawing. Application December 2, 1939, Serial No. 307,259

13 Claims. (Cl. 260—583)

The present invention pertains to the manufacture of amines by amination and reduction of aldehydes and ketones. The invention is related to the process described by Mignonac in "Comptes Rendus," volume 172, page 223, in that it involves reaction of a carbonyl compound with ammonia in the presence of a mutual solvent, hydrogen and a hydrogenation catalyst.

In accordance with the Mignonac process, a solvent such as ethyl alcohol is used. Reaction and separation conditions involved in the use of such a solvent are, however, far from ideal. Thus, when methyl ethyl ketone is treated with hydrogen and ammonia in an ethyl alcohol solvent in the practice of the Mignonac process, it is impossible to separate the desired amyl amine from the ethyl alcohol by simple distillation. Furthermore, the process results in formation of undesired by-products, including ethyl amyl ether and secondary amyl alcohol. Related ethers and undesired alcohols are similarly formed when other aliphatic or aromatic aldehydes or ketones are used as starting materials in the Mignonac process.

The present invention rests upon the discovery that aliphatic and aromatic aldehydes and ketones may be simultaneously reacted with ammonia and hydrogen in such a manner as to avoid the above difficulties, provided a secondary or tertiary alcohol is substituted for ethyl alcohol as the mutual solvent. When a secondary or tertiary alcohol is used as a mutual solvent, both the yield and conversion to the desired amine are improved as compared to the case in which methyl or ethyl alcohol is used as the solvent. Furthermore, difficulty in separating other constituents of the reaction mixture from the secondary or tertiary alcohol used as a common solvent may be avoided, by proper choice of a secondary or tertiary alcohol as the mutual solvent, having a boiling point substantially removed from the boiling points of other constituents of the reaction mixture. Thus, in cases in which the carbonyl compound to be aminated and reduced is acetone, butanone, or pentanone, secondary alcohols corresponding in carbon content and structure to these ketones may be employed (i. e., alcohols which would be formed by the reduction of the ketones in question), for the amines formed by amination and reduction of these ketones boil at temperatures substantially below those at which constant boiling mixtures between the corresponding alcohols and water are formed. It has been found that the use (as the mutual solvent) of the alcohol which would normally be formed by reduction of the ketone has the advantage of improving the yield, but it is not absolutely necessary to use this particular secondary alcohol in order to effect improvement in yield. In the case of formation of amines containing 7 or more carbon atoms, by amination and reduction of the corresponding aldehydes and ketones, the distillation ranges of the amines and the corresponding alcohols are very close together, thereby introducing difficulties in the ultimate distillation, in case alcohols corresponding in carbon content and structure to the ketones are employed. It is therefore preferable, in the amination and reduction of carbonyl compounds containing 7 or more carbon atoms, to employ secondary or tertiary alcohols of lower molecular weight as the mutual solvents. Isopropanol, for example, may be used with advantage as the mutual solvent, in the manufacture of amines containing 7 or more carbon atoms. It is not necessary, however, to use this particular alcohol as a mutual solvent since any secondary or tertiary alcohol having distillation characteristics which render separation from the reaction mixture feasible, may be employed.

The invention may be carried out according to the following procedure. The ketone or aldehyde to be converted into an amine is placed in an autoclave or other suitable pressure vessel together with the secondary or tertiary alcohol which is to be used as the mutual solvent. The quantity of the solvent will vary from approximately 10% of the volume of the carbonyl compound to a quantity which may be somewhat in excess of the quantity of the carbonyl compound. In most experiments, good results have been obtained with a quantity of solvent equal to approximately one-fourth of the volume of the carbonyl compound. The use of such quantity of the solvent enables us to obtain rapid reduction of the carbonyl compound without formation of excessive pressure, such as would occur if no solvent were used. The use of the solvents of the invention has the further advantage that it causes the reaction to go almost completely to the right, with great rapidity. In general, when larger amounts of solvent are employed, the reaction is more rapid, and the pressure and temperature conditions necessary to effect conversion to the desired amine are also reduced.

An active hydrogenating catalyst is next added to the solution of the carbonyl compound in the solvent. Platinum, palladium, nickel, nickel oxide, or other catalysts may be employed. Metallic nickel catalysts are preferred, however, both because of their high effectiveness in promoting the hydrogenation reaction, and because of their cheapness. The amount of catalyst may vary between 1 and 7% of the amount of aldehyde or ketone to be aminated, depending upon the reactivity of the particular aldehyde or ketone under treatment. An amount of finely divided catalytic nickel between 3 and 5% of the amount of carbonyl compound under treatment will usually be found sufficient to effect the desired catalysis.

After the catalyst is added, the autoclave is closed, and liquid ammonia is forced into the autoclave. The amount of ammonia used will vary from ⅓ mol. of ammonia per mol. of carbonyl compound to two or more mols. ammonia per mol. of carbonyl compound, depending upon whether a tri-substituted, di-substituted or mono-substituted amine is desired. Hydrogen is then run in from a cylinder until the quantity of hydrogen in the autoclave is sufficient to cause an increase of pressure of between 100 and 1000 pounds, as compared with the pressure before introduction of the hydrogen.

The autoclave is next heated during continuous agitation of the mixture. This heating is continued until the pressure in the autoclave drops rather suddenly, indicating that a substantial amount of hydrogen has been used up in hydrogenation of the carbonyl compound. The temperature at which this pressure drop occurs will vary, depending upon the particular carbonyl compound under treatment, and other conditions. It sometimes occurs slightly below 100° C., but in other cases may not occur until the temperature reaches approximately 170° C. It is sometimes preferable to heat the contents of the autoclave rapidly to a temperature of approximately 200° C. in order to accomplish the hydrogenation, although for most aldehydes and ketones, a moderately rapid reaction occurs between 120 and 140° C.

After the reaction is substantially complete; i. e., when the drop in pressure indicates that the rate of absorption of hydrogen has become almost negligible, the excess hydrogen is bled off and the product transferred to a fractionating still, where it is separated into its constituents by fractional distillation. The secondary or tertiary alcohol solvent recovered from such distillation may be returned to the autoclave and used as a mutual solvent for further quantities of the carbonyl compound and ammonia in the repeated practice of the reaction. Such return of the mutual solvent to the autoclave is advantageous in the practice of the process for two reasons. In the first place, some valuable material is recovered in this way. In the second place, the impurities present in the residue are, for the most part, impurities formed in the reaction, and the presence of these impurities in the subsequent reaction mixture thus tends to depress formation of similar impurities in the subsequent reaction as will be understood by those skilled in the art.

While we have referred in the above discussion to the practice of the invention in treating aldehydes and ketones with ammonia to effect simultaneous amination and hydrogenation, it will be understood that various primary and secondary amines may be substituted for ammonia in the practice of the invention, since such amines are equivalent to ammonia in that they react similarly to ammonia when used in the practice of the invention as described above.

EXAMPLE I

*Manufacture of 2-amino butane in absence of solvent*

1440 grams (20 mols.) of butanone-2 and 82 grams of Raney nickel catalyst were placed in a 2-gallon stainless steel autoclave. 490 grams (28.8 mols.) of anhydrous ammonia was added and the mixture heated for 40 minutes to a temperature between 140 and 164° C., under hydrogen pressure sufficient to maintain the pressure in the system between 1260 and 1400 lbs. gauge pressure. Then, during an additional 15 minutes the temperature of the system was raised from 164 to 194° C. At the latter temperature, the pressure, which had been 1400 lbs. per square inch at 164° C., rose to 1950 lbs. per square inch. After cooling, the contents of the autoclave were removed and subjected to distillation, employing a dry ice reflux condenser during the time the ammonia was removed. By distillation, there was obtained 947 grams of secondary butyl amine. This is equal to 12.97 mols., and involves a conversion of 64.9%.

EXAMPLE II

*Manufacture of 2-amino butane employing butanol-2 as a solvent*

The above experiment was repeated, employing 400 grams of secondary butyl alcohol as a solvent. After introduction of the ammonia, hydrogen was applied to the system until the total pressure was 1020 lbs. per square inch. The autoclave was now heated with agitation and maintained between 130 and 152° C. for 27 minutes. The temperature was then raised, as in the preceding example, to 194° C. After removal of the ammonia, the product was distilled through a 5 ft. helix packed column employing a 20 to 1 reflux ratio. A cut boiling up to 64° C., titrating 98.5% as secondary butyl amine, and weighing 1307 grams was obtained. A second cut boiling between 64 and 70° C. weighed 30 grams and titrated 71% as secondary butyl amine. A third cut boiling between 70 and 84° C. weighed 53 grams and titrated 36.3% as secondary butyl amine. The total weight of amine produced was 1328 grams or 18.2 mols. The conversion was thus 91%.

EXAMPLE III

*Preparation of 2-amino butane from butanone-2 employing tertiary butyl alcohol as a solvent*

1440 grams (20 mols.) of butanone-2 and 400 grams of tertiary butanol were placed in an autoclave of 2-gallon capacity with a quantity of Raney nickel catalyst equal to 5% of the weight of the ketone. 600 grams of anhydrous ammonia was added and hydrogen introduced until the pressure reached 970 lbs. per square inch. The autoclave was heated during continuous agitation, and was maintained at a temperature between 142 and 160° C. for a period of 23 minutes. Then, during an additional period of 13 minutes, the temperature was raised from 160 to 178° C. The autoclave was then allowed to cool, and the contents were withdrawn. Upon working up the batch by distillation, 1253 grams, or 17.16 mols. of secondary butyl amine was obtained, representing a conversion of 85.8%.

Various modifications will be obvious to those skilled in the art, and I do not therefore wish to be limited except by the scope of the sub-joined claims.

I claim:

1. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a solvent chosen from the class consisting of lower, saturated, monohydric secondary and tertiary aliphatic alcohols, until amination and reduction of said carbonyl compound have taken place to form the desired amine.

2. In the formation of amines by the catalytic reaction of hydrogen, ammonia and an aldehyde, the step of conducting the reaction by heating the reactants to a point below the decomposition temperature of the amine to be formed, in the presence of a solvent chosen from the class consisting of lower, saturated, monohydric secondary and tertiary aliphatic alcohols, until amination and reduction of said carbonyl compound have taken place to form the desired amine.

3. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a lower, saturated, monohydric secondary aliphatic alcohol containing not over 7 carbon atoms, until amination and reduction of said carbonyl compound have taken place to form the desired amine.

4. In the formation of amines by the catalytic reaction of hydrogen, ammonia and an aldehyde containing between 1 and 5 carbon atoms, the step of conducting the reaction by heating the reactants to a point below the decomposition temperature of the amine to be formed, in the presence of a solvent chosen from the class consisting of lower, saturated, monohydric secondary and tertiary aliphatic alcohols, until amination and reduction of said carbonyl compound have taken place to form the desired amine.

5. In the formation of amines by the catalytic reaction of hydrogen, ammonia and an aldehyde containing between 1 and 5 carbon atoms, the step of conducting the reaction by heating the reactants to a point below the decomposition temperature of the amine to be formed, in the presence of a lower, saturated, monohydric secondary aliphatic alcohol containing the same number of carbon atoms as the carbonyl compound to be aminated, until amination and reduction of said carbonyl compound have taken place to form the desired amine.

6. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a solvent consisting of a lower, saturated, monohydric secondary aliphatic alcohol, until amination and reduction of said carbonyl compound have taken place to form the desired amine.

7. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a solvent consisting of a lower, saturated, monohydric tertiary aliphatic alcohol, until amination and reduction of said carbonyl compound have taken place to form the desired amine.

8. In the formation of amines by the catalytic reaction of hydrogen, ammonia and a ketone, the step of conducting the reaction by heating the reactants to a point below the decomposition temperature of the amine to be formed, in the presence of a solvent chosen from the class consisting of secondary and tertiary, lower, saturated, monohydric aliphatic alcohols until amination and reduction of said ketone have taken place to form the desired amine.

9. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a lower, saturated, monohydric tertiary alcohol containing not over 7 carbon atoms, until amination and reduction of said carbonyl compound have taken place to form the desired amine.

10. In the formation of amines by the catalytic reaction of hydrogen, ammonia and a ketone containing between 1 and 5 carbon atoms, the step of conducting the reaction by heating the reactants to a point below the decomposition temperature of the amine to be formed, in the presence of a solvent chosen from the class consisting of lower, saturated, monohydric secondary and tertiary aliphatic alcohols, until amination and reduction of said carbonyl compound have taken place to form the desired amine.

11. In the formation of amines by the catalytic reaction of hydrogen, ammonia and a ketone containing between 1 and 5 carbon atoms, the step of conducting the reaction by heating the reactants to a point below the decomposition temperature of the amine to be formed, in the presence of a lower, saturated, monohydric secondary aliphatic alcohol containing the same number of carbon atoms as the carbonyl compound to be aminated, until amination and reduction of said carbonyl compound have taken place to form the desired amine.

12. In the formation of amines by the catalytic reaction of hydrogen, ammonia and an aldehyde containing between 1 and 5 carbon atoms, the step of conducting the reaction by heating the reactants to a point below the decomposition temperature of the amine to be formed, in the presence of a lower, saturated, monohydric tertiary alcohol containing the same number of carbon atoms as the carbonyl compound to be aminated, until amination and reduction of said carbonyl compound have taken place to form the desired amine.

13. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a lower, saturated, monohydric tertiary alcohol containing the same number of carbon atoms as the carbonyl compound to be aminated, until amination and reduction of said carbonyl compound have taken place to form the desired amine.

JOHN F. OLIN.